United States Patent [19]

Rabin

[11] 4,191,366
[45] Mar. 4, 1980

[54] UNIVERSAL PLANETARY CLAMPING DEVICE

[75] Inventor: Yehuda Rabin, South Caulfield, Australia

[73] Assignee: Dart Industries Inc., Los Angeles, Calif.

[21] Appl. No.: 873,458

[22] Filed: Jan. 30, 1978

[51] Int. Cl.$^2$ .......................... B23D 7/08; B23Q 1/08
[52] U.S. Cl. .................................. 269/47; 269/321 A
[58] Field of Search ................. 269/47, 309, 311–314, 269/321 A, 296; 33/185, 181 R; 279/7, 99

[56] References Cited

U.S. PATENT DOCUMENTS

| | | |
|---|---|---|
| 3,565,416 | 2/1971 | Williamson et al. .................... 269/47 |
| 3,942,780 | 3/1976 | Clement ........................... 269/321 A |
| 4,140,305 | 2/1979 | Rabin .................................... 269/47 |

Primary Examiner—Robert C. Watson
Attorney, Agent, or Firm—Leigh B. Taylor

[57] ABSTRACT

The base surface of a rigid plate rests upon the work support surface of a machine tool. An insert, having an aperture therethrough, is journalled within the plate. A pin is detachably affixed to a work piece and extended through the aperture. Access is provided through the edge of the plate for engaging the pin to the insert and for cammingly advancing and retracting the insert relative the base surface. In response to advancement of the insert, the work piece is drawn against the work bearing surface of the plate. Random aperture location to accommodate several randomly placed pins is provided by a plurality of rotatably journalled inserts, each having a slotted aperture.

17 Claims, 5 Drawing Figures

UNIVERSAL PLANETARY CLAMPING DEVICE

This invention relates to work holding attachments for machine tools.

More particularly, the present invention concerns an improved fixture for holding a work piece during machining operations.

In a further aspect, the instant invention concerns an improved fixture for engaging a single surface of a work piece and holding the work piece in close proximity to the work support surface of a machine tool.

Machining is a common industrial process for creating a finished and useful item from stock. The stock which may be metallic, plastic or an infinite variety of other natural or synthetic materials, usually in solid form, is generally referred to as the work piece. In the simplest and crudest form, the work piece is a hunk of raw material obtained from bulk stock, commonly by severing a segment of appropriate size from a larger piece of stock. The work piece, in a more sophisiticated embodiment, may be partially finished as a result of prior fabrication processes. A previously finished item which is being repaired, altered, or having other operations performed thereon, also comprises a work piece.

Machining is concerned with the controlled removal of material from the work piece in accordance with a predetermined plan to yield a work product. Drilling, turning, boring, grinding, shaping and planing are exemplary of common material removing or machining operations. Various mechanical devices, generically named machine tools, are used to perform machining operations. Machine tools include such well known devices as a drill press, lathe, vertical and horizontal milling machines, surface grinder, internal and external grinders, shaper and planer. Other machine tools and cutting processes will readily occur to those skilled in the art.

A basic function of a machine tool is to bring a cutting tool and a work piece together. Either the cutting tool or the work piece is in motion to create the cutting action. In a lathe, a stationary cutting tool is passed over the surface of a rotating work piece. Conversely, the milling machine moves a stationary work piece against a rotating cutter. Other moving relationships are found in other machine tools.

Commonly, machine tools are provided with a bed, table, face plate or other component having a work support surface. Generally, apertures, slots or other means are provided for securing the work piece directly to the work support surface, or for attachment of an auxiliary work holding device such as a vice or face plate. Each type of work holding device has inherent characteristics and offers unique advantages for specific types of machining operations. Since only one surface of the work piece is required for securement, the face plate generally offers the distinct benefit of exposing a greater portion of the work piece for machining during a single set-up.

Preparatory for securement to the face plate, a work piece is provided with a flat base surface. Threaded holes, usually two or more as required for proper support, are formed into the work piece from the base surface. The base surface of the work piece is then placed against the work support surface of the face plate, and bolts passed through apertures in the face plate and engaged with the threaded holes in the work piece.

While adequately supporting the work piece and exposing a substantial portion of the surface thereof, the conventional practice as described above had certain inherent limitations. Of primary concern was the alignment between the tapped holes in the work piece and the apertures within the face plate. Either the threaded holes in the work piece must be accurately located to align with preexisting apertures within the plate, or new apertures created in the plate for the immediate purpose. The former case represented an undesirable burden by slowing the production process and elevating the cost of the work product. The latter case eventually destroyed the face plate.

In an attempt to remedy the deficiencies of conventional practice, the prior art has recently provided a work holding fixture which can be used generally interchangably with a face plate. The work holding fixture, substantially a rigid plate, has a plurality of spindles rotatably journalled therein. Each spindle has an elongate slot therethrough. In response to rotation of a spindle, the respective slot can assume a position for passage of a bolt therethrough into the work piece at any location within a circle defined by the outer edge of the aperture. The fixture eliminated the requirement for accurately placed holes within the work piece and further eliminated the necessity of custom drilling the face plate.

The fixture, however, provided only a partial solution to the shortcomings of the prior art and has proven to be inadequate in use with certain machine tools and under certain machining operations. Sufficient clearance must be provided on the backside of the face plate for manipulation of the bolt which extends through the fixture into the work piece. The space requirement is generally of minor concern when the fixture is positioned perpendicularly to the work support surface of the machine tool. When positioned parallel to the work supporting surface, as is frequently required during machine tool practice, the fixture must be elevated. This represents a serious limitation. For example, machine tools have a characteristic maximum distance between the cutting tool and the work support surface. Height which is occupied by the work holding fixture subtracts from the working height of the machine and places a dimensional limit upon the work piece. The fixture is inoperative in combination with machine tools of limited capacity. Also, the ability of a machine tool to remove stock at a rapid rate is limited, at least partially, by the rigidity of the work piece. As a general rule, rigidity is decreased in proportion to the distance of the work piece from the normal work support surface of the machine tool. Further, it is an annoyance and a hindrance for the machinist to perform simultaneous manipulative functions on either side of the work holding fixture.

It would be highly advantageous, therefore, to remedy the deficiencies associated with the prior art.

Accordingly, it is an object of the present invention to provide an improved fixture for holding a work piece during machining operations.

Another object of the present invention is the provision of a fixture which is adapted for use with various machine tools.

Still another object of the invention is to provide a fixture for receiving and holding the base surface of a work piece.

And, another object of the invention is the provision of a fixture whereby a substantial portion of the work piece is available for machining.

Yet another object of this invention is to provide a fixture which occupies a minimal portion of the working distance of the machine tool.

And still another object of the invention is the provision of a fixture which is self-aligning with attachment means pre-formed in the work piece.

A further object of the invention is to provide a fixture which is operative at pre-selected angular arrangements relative the work support surface of a machine tool.

And a further object of the invention is the provision of a work holding fixture which can be placed in juxtaposition with the work support surface of a machine tool.

Yet a further object of the instant invention is to provide a fixture which is operative from a single position.

And yet a further object of the invention is the provision of a fixture which will rigidly support a work piece in close proximity to the work support surface of a machine tool.

Still a further object of the invention is to provide a fixture which will readily and conveniently accept pre-prepared work pieces.

Yet still a further object of the invention is the provision of a fixture of the above type which will interchangably accept work pieces of varying dimensions.

Briefly, to achieve the desired objects of the instant invention in accordance with a preferred embodiment thereof, first provided is a substantially rigid plate having a base surface and a bearing surface. The base surface is placed upon the work support surface of a machine tool and the plate is secured thereto. A bore extends through the plate between the base surface and the bearing surface. An insert is disposed within the bore for movement along the longitudinal axis thereof. Attachment means extending from a work piece are received within the insert and secured thereto. Actuator means are carried by the plate for retracting the insert from the bearing surface and drawing the work piece into contact with the bearing surface.

In a further embodiment, the attachment means is in the form of a pin which is detachably engaged with the work piece. An aperture within the insert receives the pin and connection means are provided for detachably securing the pin to the insert. The connection means may be in the form of a thrust member which engages a shoulder of the pin and bears against an opposing shoulder of the insert.

The actuator means, in a specific embodiment, comprises a thrust ring which cammingly extends and retracts the insert along the axis thereof in response to rotation of the ring. A passage is provided through the side of the plate for a tool which detachably engages and rotates the locking ring. The thrust member of the connection means is also receivable through the passage. A rotatable insert, having a slotted aperture therethrough, provides for alignment of the pin receiving aperture.

The foregoing and further and more specific objects and advantages of the instant invention will readily occur to those skilled in the art from the following detailed description of a preferred embodiment thereof, taken in conjunction with the drawings, in which.

Figures 1, 3A:
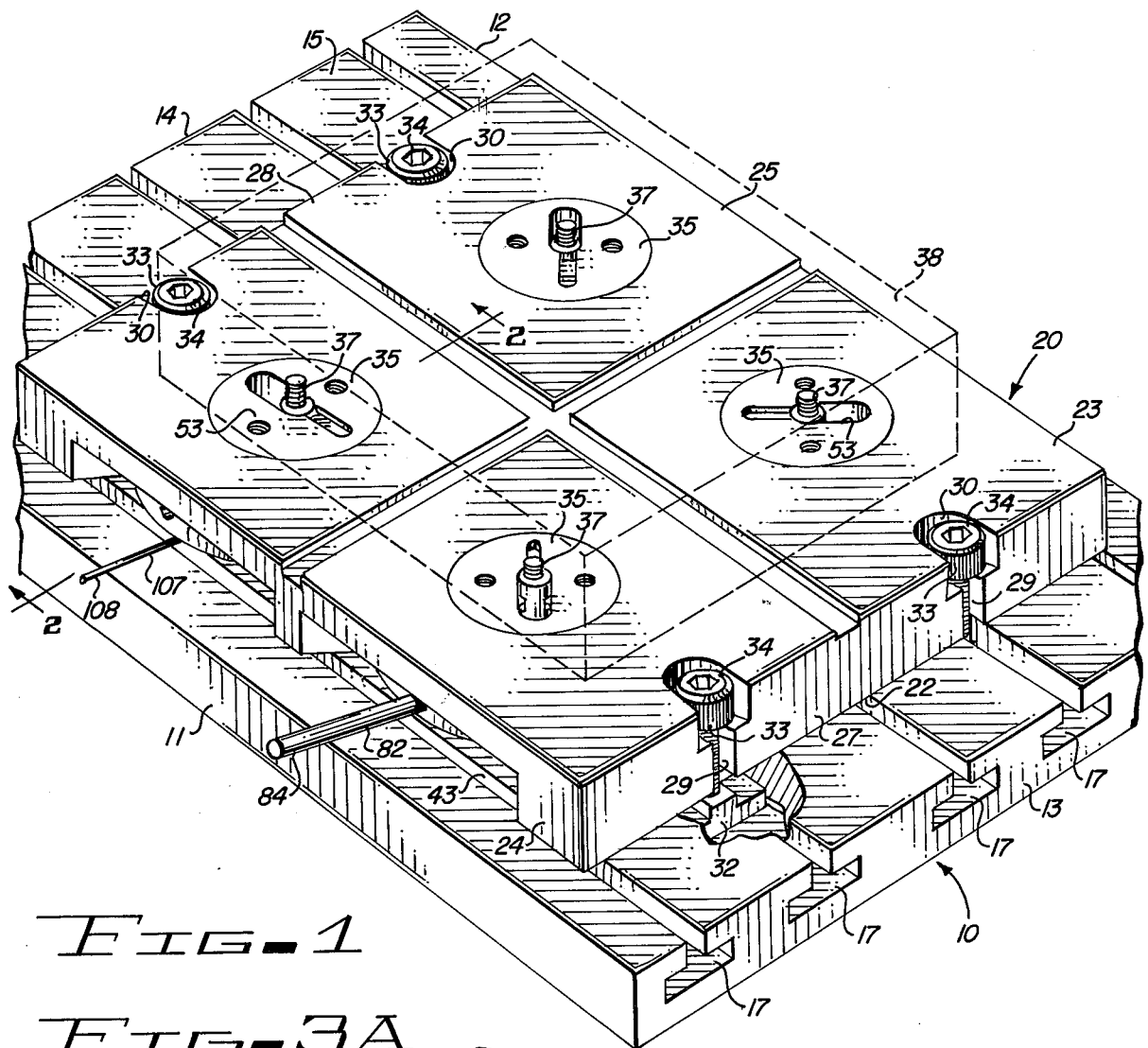
FIG. 1 is a perspective view of a work piece holding fixture constructed in accordance with the teachings of the instant invention as it would appear when secured to the normal work support surface of a machine tool and holding a work piece, the work piece being shown in broken outline.
FIG. 3a is an enlarged fragmentary vertical sectional view taken along the line 3-3 of FIG. 1 and showing the device thereof as it would appear in the work piece receiving position.

Turning now to the drawings, in which like reference characters indicate corresponding elements throughout the several views, attention is first directed to FIG. 1, which shows a table 10 of the type commonly associated with machine tools. While more specifically resembling a milling machine table, table 10 is intended to be generally representative of tables found on other machine tools, such as shapers, planers, grinders and drill presses. Similar devices, termed face plates, are used with lathes and other rotary machinery, such as certain types of grinders. It will be readily appreciated by those skilled in the art that all machine tool tables, including face plates and similar devices, are similarly structured, have analogous features and are for corresponding functions.

Table 10 is a substantially rigid structure, usually fabricated of steel, cast iron or similar material, having front edge 11, rear edge 12, ends 13 and 14 and upper surface 15. A work piece or an ancillary work holding device such as a rotary table, angle plate or vise is normally placed upon upper surface 15, also termed the work support surface. The work piece of work holding device is secured to table 10 by various work hold-down means which are engagable with selected ones of the plurality of T-slots 17 extending in parallel relationship along table 10 and opening to work support surface 15. Various other arrangements, including grooves and apertures, are integral with other work support surfaces for corresponding purposes, as will be appreciated by those skilled in the art.

Also seen in FIG. 1 is a preferred embodiment of the fixture of the instant invention as it would appear when secured to table 10. The fixture includes a substantially rigid plate generally designated by the reference character 20, having a base surface 22, a work bearing surface 23, front and rear edge surfaces 24 and 25, respectively, and end surfaces 27 and 28. Slots 29 extend inwardly from end surfaces 27 and 28 between surfaces 22 and 23, and include recesses 30 extending downwardly from work bearing surface 23. Base surface 22 rests upon work support surface 15. Conventional T-nuts 32 reside in appropriate T-slots 17 in alignment with slots 29. Cap screw 33 extend through slots 29 into respective T-nuts 32. Each cap screw 33 has a head 34 which is received in the appropriate recess 30 below the level of work bearing surface 23 to provide an unobstructed surface. Other arrangements for securing plate 20 to work table 10 will readily occur to those skilled in the art. Similarly, it is recognized that plate 20 may be readily secured to other work support surfaces, such as angle plates, face plates and rotary tables. Preferably, plate 20 is metallic and can be secured in the normal manner to magnetic work holding devices, as commonly found on certain types of machine tools, such as surface grinders.

A plurality of inserts 35 are carried within plate 20. Each insert 35 has attachment means 37 extending therefrom which engage a work piece shown in broken outline 38. The action of the inserts 35, and the mechanism associated therewith, draws work piece 38 tightly against work bearing surface 23. The work holding function of the present invention will become apparent as the description ensues.

Figure 2:
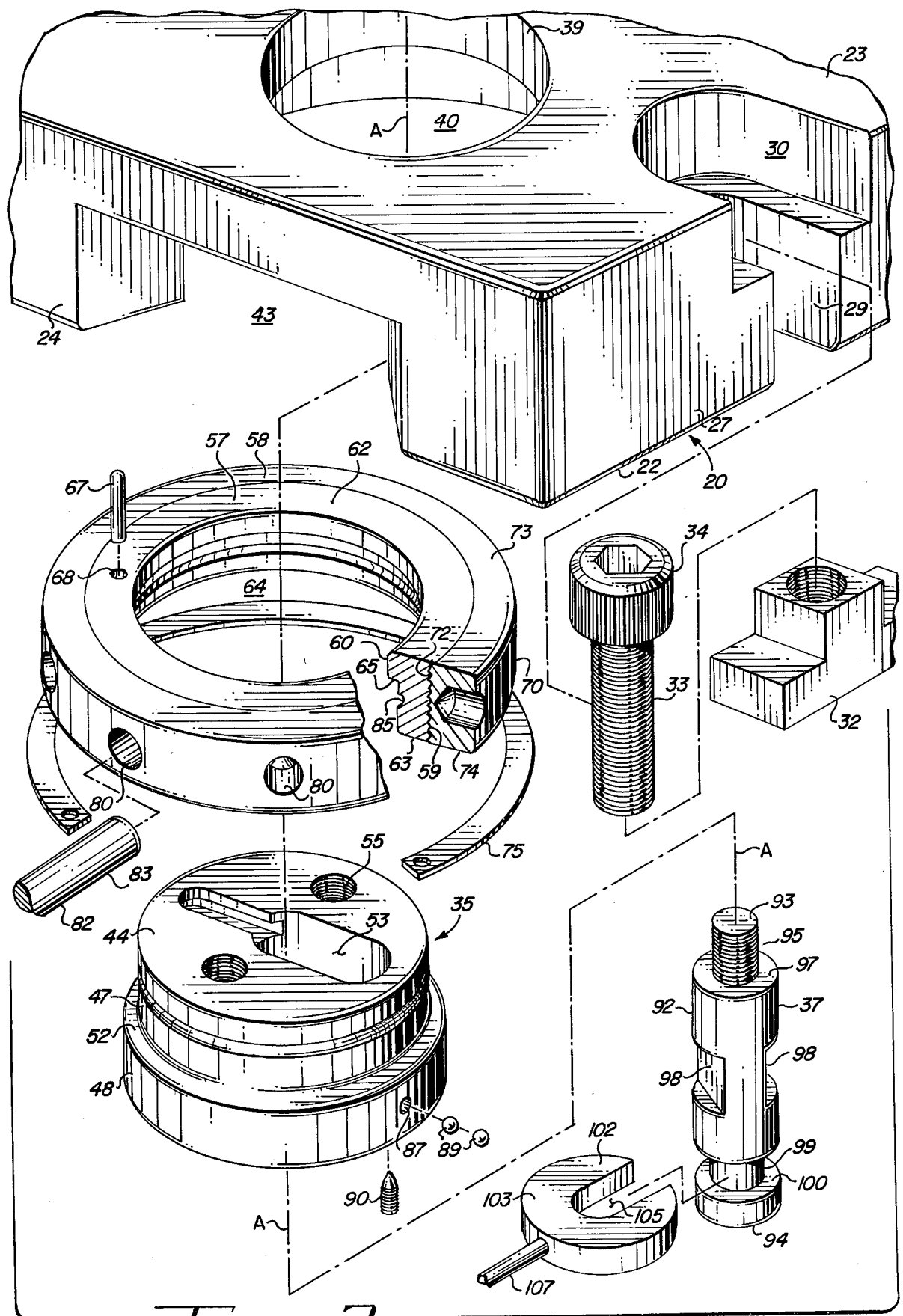
FIG. 2 is an enlarged exploded partial perspective view of the device of FIG. 1, components thereof being broken for purposes of illustration.
Figure 4:
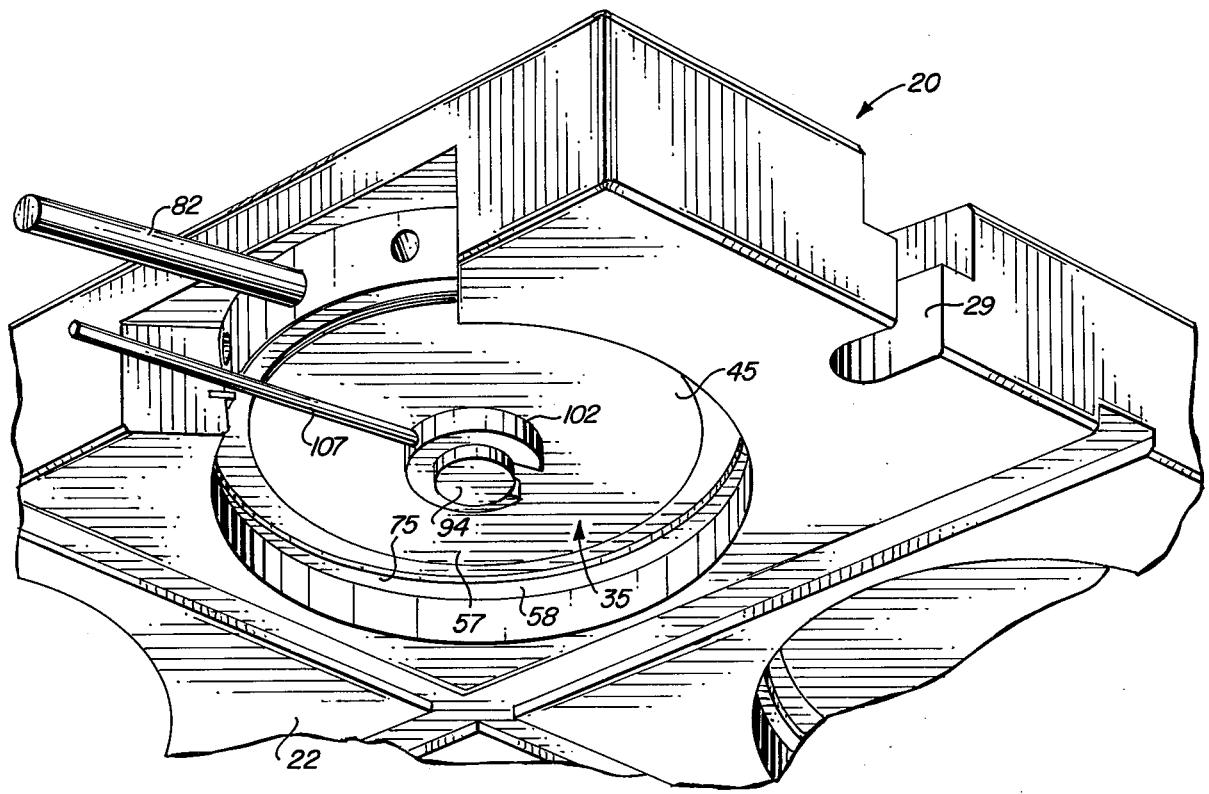
FIG. 4 is a partial perspective view of the underside of the fixture of FIG. 1.

A typical insert 35, and elements associated therewith, will now be described with particular reference to FIG. 2. Bore 39 extends through plate 20 between base surface 22 and work bearing surface 23. A counterbore 40 extends inwardly from base surface 22 concentric with the longitudinal axis of bore 39, the latter being represented by the broken line A. Counterbore 40, as better viewed in FIG. 4, terminates with an annular shoulder 42 as seen in FIG. 3. Passage 43 communicates between counterbore 40 and front edge surface 24.

Insert 35 has a first end 44, second end 45, first section 47 and second section 48. First section 47 is sized to be rotatably and slidably journalled within bore 39. An O-ring seal 49, residing in annular groove 50 formed in first section 47 proximate first end 44, prevents the passage of machining fluids, machining particles and other contaminants from upper surface 23 of plate 20 to the actuating mechanism as will be described presently. Annular shoulder 52 extends between first section 47 and second section 48, which is enlarged and resides within counterbore 40.

Aperture 53, extending through insert 35 between first end 44 and second end 45, is in the form of an elongate slot which extends radially from axis A. A cylindrical member, placed in aperture 53, can move from a centered position in which the longitudinal axis of the cylindrical member is aligned with axis A to a position proximate the periphery of insert 35. T-slot 54 is formed in first end 44 of insert 35 and extends in a direction diametrically opposed to aperture 53 and has an end thereof open to aperture 53. Thus, a T-nut or head of a T-bolt can be passed through aperture 53 for engagement within T-slot 54. Threaded apertures 55 are also formed in insert 35, extending inwardly from first end 44. Slotted aperture 53, T-slot 54 and threaded apertures 55 are useful for holding a work piece, as will be described hereinafter.

The actuator means associated with the instant embodiment includes thrust ring 57 and locking ring 58, which reside in counterbore 40. Thrust ring 57 is an annular member having outer surface 59, inner surface 60, first end 62 and second end 63. Counterbore 64 extends inwardly from second end 63 and terminates with annular shoulder 65 extending to inner surface 60. Insert 35 and thrust ring 57 are interlocked for relative movement in one direction by the abutment of shoulder 52 against shoulder 65. Accordingly, as thrust ring 57 moves in a direction away from work support surface 23, insert 35 is forced in the same direction. Guide pin 67, press fitted into aperture 68, extends from first end 62 of locking ring 57 substantially parallel to axis A. The projecting portion of guide pin 67 is slidably received in guide socket 69. Pin 67 and socket 69 comprise stabalizing means for preventing rotation of thrust ring 57 relative plate 20.

Annular locking ring 58 includes outer cylindrical surface 70, inner cylindrical surface 72 and first and second ends 73 and 74, respectively. Outer cylindrical surface 70 is rotatably journalled within counterbore 40. First end 73 is a thrust surface which bears against annular shoulder 42. Split ring 75, carried in annular groove 77, extending radially outward from counterbore 40, receives second end 74 of locking ring 58 thereagainst and provides retention means for retaining locking ring 58 within counterbore 40.

Thrust ring 57 and locking ring 58 have a camming relationship such that longitudinal movement along axis A is imparted to thrust ring 57 in response to rotation of locking ring 58. The camming relationship may be affected by various camming means carried by thrust ring 57 and complemental cam means carried by locking ring 58. In the immediate embodiment, the cam means comprises an external screw flight 78 carried by outer surface 59 of thrust ring 57, and a matingly engagable internal screw flight 79 carried by inner surface 72 of locking ring 58.

A plurality of angularly spaced bores 80 extend radially inward from outer surface 70 of locking ring 58. Elongate tool element 82, having engaging end 83 and hand grip end 84, is used for rotating locking ring 58. The several bores 80 function as sockets for sequencially receiving engaging end 83. Tool element 82 is received through passage 43 which is of sufficient width to expose at least two bores 80.

An annular groove 85 is carried in counterbore 64 of thrust ring 57. Bore 87, extending radially inward from second section 48 of insert 35, is aligned with annular groove 85. Threaded aperture 88 extends inwardly from second end 45 of aperture 35 and intercepts radial bore 87. Balls 89 are carried in bore 87 and the movement of the balls 89 within bore 87 is controlled by grub screw 90 threadedly engaged within aperture 88. As specifically illustrated in FIG. 3a, grub screw 90 is in the advanced position, abutting the inner ball 89 and urging the outer ball 89 into annular groove 85. It is noted that outer ball 89 resides partially within annular groove 85 and partially within bore 87. Groove 85 provides a race for outer ball 89 during rotary motion of insert 35 relative thrust ring 57. The foregoing arrangement functions as a detent for preventing axial movement of insert 35 relative thrust ring 57. Upon retraction of grub screw 90, both balls 89 are free to move completely within bore 87, whereby insert 35 is removable from thrust ring 57 in a direction away from work bearing surface 23 of plate 20.

Attachment means 37 includes pin 92, having first and second ends 93 and 94, respectively, which is received through aperture 53. First end 93 of pin 92 extends beyond first end 44 of insert 35 and second end 94 of pin 92 projects beyond the second end 45 of insert 35. Pin 92 is movable within elongated aperture 53 between an initial position in alignment with axis A and variable selected positions spaced from axis A. Work piece engaging means in the form of threaded stud 95 and shoulder 97, as will be hereinafter described in greater detail, are carried proximate first end 93 of pin 92. Opposed parallel flats 98, sized to receive a conventional wrench for rotation of pin 92 and located intermediate ends 93 and 94, are also integral with the working engaging means.

Annular groove 99, having radial shoulder 100, is formed in pin 92 proximate second end 94. Thrust member 102, having opposed sides 103 and 104, includes an elongate slot 105 which is receivable by annular groove 99. Elongate stem 107 extends from thrust member 102 and has hand grip section 108 at the free end thereof. Thrust member 102 is receivable through passage 43 concurrent with tool element 82 and is of sufficient length for hand grip section 108 to project beyond edge surface 24 of plate 20 when thrust member 102 is engaged with pin 92.

The function of the foregoing described embodiment of the instant invention and the procedure for holding a work piece in a machine tool in accordance with the instant invention will now be described. Initially, plate 20 is placed upon table 10 with base surface 22 against work support surface 15. Utilizing T-nuts 32 and cap screws 33 the fixture is secured to table 10 in accordance with the standard procedure for securing other well known ancillary work holding devices to a machine tool table in accordance with conventional practice in the art. Also, in accordance with well known procedure, a base surface having tapped holes extending inwardly therefrom is prepared on the work piece. Generally, two or more tapped holes are required to rigidly affix the work piece and resist the forces of machining operations.

Threaded stud 95 of pin 92 is engaged with a selected threaded hole within the work piece. A wrench is engaged with flats 98 and pin 92 rotated until shoulder 97 firmly abuts the base surface of the work piece in a manner analogous to tightening a conventional bolt. The quantity of pins 92 engaged with the work piece is determined by the machine tool operator in order to obtain the desired holding strength. An object of the instant invention is to alleviate the necessity of accurately tapped holes. However, the holes must be located within pre-determined zones. A zone is described as the circle defined by aperture 53 in response to rotation of insert 35.

For purposes of description, each insert 35 is assumed to be at an initial position as illustrated in FIG. 3a. First end 62 of thrust ring 57 is against annular shoulder 42 of counterbore 40, and first end 44 of insert 35 is near work bearing surface 23 of plate 20. The work piece is lowered with pins 92 entering respective apertures 53 until the base surface of the work piece rests upon work bearing surface 23. As the work piece is lowered, appropriate inserts 35 are rotated as necessary to bring apertures 53 into alignment with the respective pins 92. Subsequently, the machine tool operator, holding hand grip section 108 of stem 107, passes thrust member 102 through passage 43 engaging thrust member 102 with annular groove 99 of pin 92. This action is repeated until a thrust member 102 is engaged with each pin 92.

Thereafter, each locking ring 58, associated with an insert 35 having a pin 92 therethrough, is rotated. To accomplish rotation of locking ring 58, the machine tool operator grasps tool element 82 by hand grip end 84 and, passing tool element 82 through passage 43, inserts engaging end 83 into a bore 80. Tool element 82 is moved in a normal tightening direction, usually clockwise, until either no further movement of locking ring 58 is felt or until tool element 82 strikes the side of passage 43. In the latter case, tool element 82 is withdrawn from the immediate bore 80, repositioned in a subsequent bore 80, and the action repeated. During the rotation of lock ring 58, thrust ring 57 is cammingly moved in a direction away from annular shoulder 42. Annular shoulder 65 of thrust ring 58, bearing against annular shoulder 52 of insert 35, moves insert 35 along axis A in a direction away from work bearing surface 23 of plate 20. Pin 92 is also caused to move along axis A in a direction away from work bearing surface 23, since second end 45 of insert 35 bears against thrust member 102 which, in turn, bears against radial shoulder 100 of pin 92. Due to the movement of pin 92 and insert 35 in response to rotation of locking ring 58, the base surface of work piece 38 is drawn firmly against work bearing surface 23.

Figure 3B:
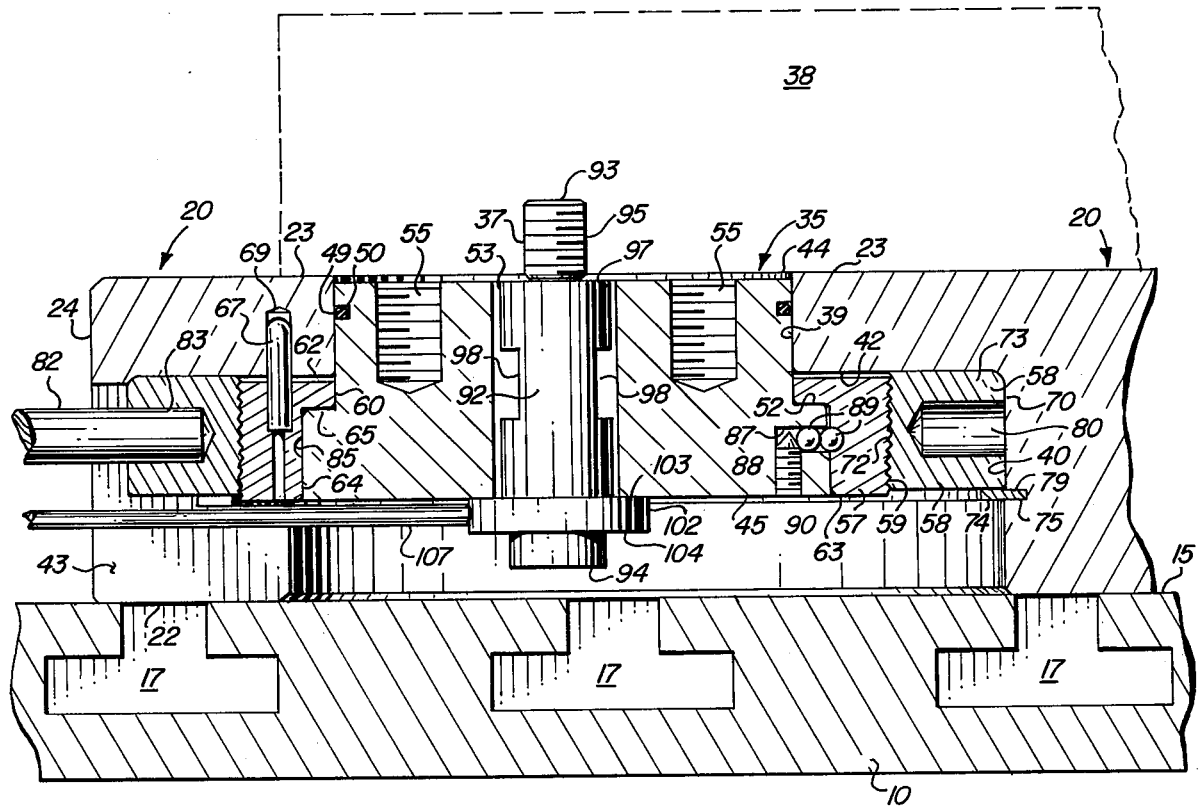
FIG. 3b is a view generally corresponding to the view of FIG. 3a and showing the device thereof in the subsequent work pieceholding position.

FIG. 3b illustrates the fixture as it would appear in the work holding position. The use of tool element 82 and stem 107 is best viewed in FIG. 4. The distance insert 35 must be retracted in order to bring work piece 38 against work bearing surface 39 is primarily a function of the distance between shoulders 97 and 100 of pin 92 minus the thickness of thrust member 102, as measured between opposed sides 103 and 104. In the initial, or work receiving position, shoulder 100 must reside at a sufficient distance from second end 45 of insert 35 to receive thrust member 102 therebetween. A special location of shoulder 100 is fixed by the abutment of the base of the work piece against work bearing surface 23. Accordingly, insert 35 is moved in a direction away from work bearing surface 23 until contact is made between second end 45 and side 103. As previously noted, the force of the contact must be sufficient to immobilize the work piece. The device of the instant invention can be manufactured such that movement of insert 35 along axis A need only be a few thousandths of an inch.

The degrees through which locking ring 58 need be rotated between the work receiving position and the work holding position is generally a function of the helical angle, or lead, of the complemental camming means between thrust ring 57 and locking ring 58. In the immediate embodiment, the cam means are in the form of external and internal screw flights 78 and 79, respectively. As will be readily recognized by those skilled in the art, the use of a sixteen pitch single thread will yield a lead distance of 0.0625 inches. Accordingly, rotating locking ring 58 through 45 degrees will move insert 35 approximately 0.008 inches along axis A.

For removal of the work piece, locking ring 58 is rotated in a counter direction, utilizing tool element 82. Stem 107, with thrust member 102, is withdrawn from pin 92 and the work piece lifted from plate 20. Subsequently, pins 92 are withdrawn from the work piece and attached to another work piece. Alternately, another work piece, having corresponding pins 92 previously attached thereto, is affixed to plate 20 as previously described.

Work piece 38 may be affixed to plate 20 by means other than the means previously described. Utilizing T-slot 54 or threaded apertures 55, the work piece is secured in accordance with conventional practice. Alternately, pin 92 can be provided with a threaded aperture, or T-slot, extending inwardly from shoulder 97 in lieu of threaded stud 95. Pins 92 may also have an extended length to accommodate a work piece which is supported in a spaced relationship from work bearing surface 23 by various stand-off devices, such as those commonly referred to as parallels, Such modifications do not alter the function of the device as previously described.

Other modifications and variations to the embodiment herein chosen for purposes of illustration will readily occur to those skilled in the art. Grub screw 88 selectively retains ball 89 in groove 85 and provides for disassembly of insert 35 from thrust ring 57. A spring residing in bore 87 and bearing against ball 89 will provide an equivalent structure. Similarly, end 63 of thrust ring 57 may project beyond end 45 of insert 35 and carry an internal snap ring for retention purposes, as previously described in connection with ring 77 for retaining locking ring 58.

Where the advantages offered by slotted aperture 53 carried in rotatable insert 35 are not desired, insert 35 need not rotate. In the immediate alternate embodiment, locking ring 58 can interact directly with insert 35. Insert 35 is stabilized against rotation by a pin, similar to pin 67, or other well known means, such as a key and key-ways. The external screw flight 78 is carried directly by second section 48 of insert 35. It will be appreciated that either second section 48 must be enlarged, or inner surface 72 of locking ring 58 reduced in size for mating of the complemental camming means.

Plate 20 is readily securable to various ancillary devices to facilitate particular machining operations. For angular machining, plate 20 is secured to an angular holding device, such as a sign plate. It is also envisioned, for frequent and repetitive angle machining, that work bearing surface 23 be disposed at a pre-determined angle from base surface 22. Holding a work piece at a pre-determined angle is particularly advantageous in connection with certain long range production runs.

Various other changes and other modifications will readily occur to those skilled in the art. To the extent that such modifications and variations do not depart from the spirit of the invention, they are intended to be included within the scope thereof, as determined by a fair interpretation of the following claims:

I claim:

1. For use in combination with a machine tool having a work support surface, an improved fixture for attachment to said support surface and for holding a work piece during machining operations by said machine tool, said improved fixture comprising:
   (a) a substantially rigid plate including,
      i. a base surface for resting upon the support surface of said machine tool,
      ii. a bearing surface for receiving said work piece thereagainst and spaced from said base surface, and
      iii. an edge surface extending between said base surface and said bearing surface;
   (b) a bore extending through said plate between said base surface and said bearing surface;
   (c) an insert having a first end positioned proximate said bearing surface and a second end, said insert disposed within said bore for movement along the longitudinal axis thereof;
   (d) an aperture extending through said insert between the first and second ends thereof; a pin having first and second ends and receivable within the aperture in said insert;
   (e) attachment means carried by said insert and having work piece engaging means carried proximate the first end of said pin and extending from the first end of said insert;
   (f) connection means for detachably securing said pin to said insert; and
   (g) actuator means carried by said plate for retracting said insert relative said bearing surface and urging said work piece into contact with said bearing surface.

2. The fixture of claim 1, wherein said aperture is in the form of an elongate slot extending from the axis of said insert to a point proximate the peripheral edge thereof.

3. The fixture of claim 2, wherein said insert is rotatably journalled within said bore whereby said slot is unfinitly adjustably to receive said pin at any location within a circle defined by the rotation of said slot.

4. The fixture of claim 1, wherein said connection means includes:
   (a) an abutment surface spaced from the first end of said insert and facing the second end thereof;
   (b) a radial shoulder carried proximate the second end of said pin,
      said radial shoulder spaced from and facing said abutment surface when said pin is received with the aperture in said inert; and
   (c) a thrust member having spaced opposed sides and positionable between said abutment surface and said radial shoulder, one of said sides being received against said abutment surface and the other of said sides receiving said radial shoulder thereagainst for limiting the movement of said pin in a direction toward the first end of said insert.

5. The fixture of claim 4, further including a passage extending inwardly from the edge surface of said plate for receiving said thrust member therethrough for positioning said thrust member relative said abutment surface and said radial shoulder.

6. The fixture of claim 5, further including an elongate stem extending from said thrust member and having a free end with a hand grip section and having a length such that the hand grip section projects beyond the edge surface of said plate when said thrust member is positioned between said abutment surface and said radial surface and said stem extends through the passage in said plate.

7. The fixture of claim 1, in which said actuator means comprises:
   (a) a cylindrical element proximate the second end of said insert;
   (b) cam means carried by said cylindrical element;
   (c) a locking ring having an outer cylindrical surface rotatably carried by said plate and spaced from said bearing surface;
   (d) complimental cam means carried by said locking ring and engaging said cam means; and
   (e) means for rotating said locking ring.

8. The fixture of claim 7, further including a counterbore extending inwardly from the base surface of said plate concentric with the longitudinal axis of said bore and terminating with an annular shoulder spaced from said bearing and wherein said locking ring is rotatably journalled with said counterbore and includes a thrust surface in juxtaposition with said annual shoulder.

9. The fixture of claim 8, wherein said means for rotating said locking ring includes:
   (a) a socket formed in said locking ring;
   (b) passage means communicating between the counterbore and the edge surface of said plate and exposing said socket; and
   (c) a tool element having an engaging end receivable in said socket and having a hand grip end, said tool element receivable through said passage means for rotation of said locking ring.

10. The fixture of claim 9, further including a plurality of angularly spaced sockets extending radially inward from the outer surface of said locking ring and wherein said passage means has sufficient width to expose at least two of said sockets.

11. The fixture of claim 8, further including retention means for retaining said locking ring within said counterbore.

12. The fixture of claim 11, wherein:
(a) said locking ring includes a second surface spaced from said thrust surface and spaced from the base surface of said plate; and
(b) said retention means includes,
i. an annular groove in said counterbore intermediate the second surface of said locking ring and the base surface of said plate, and
ii. a snap ring held in said groove and projecting inwardly therefrom for receiving the second surface of said locking ring thereagainst.

13. The fixture of claim 11, wherein said cylindrical element includes:
(a) a thrust ring having
i. an outer surface carrying said complimental cam means,
ii. a bore for rotatably receiving said insert therethrough, and
iii. interlock means for moving said insert in a direction away from the bearing surface of said plate; and
(b) stabilizing means for preventing rotary motion of said thrust ring relative said plate.

14. The fixture of claim 13, wherein said interlock means includes:
(a) an annular shoulder extending inwardly from the bore of said thrust ring and facing the base surface of said plate; and
(b) a complimental annular shoulder extending outwardly from said insert and bearing against the annular shoulder of said thrust ring.

15. The fixture of claim 13, wherein said stabilizing means includes:
(a) a guide pin projecting from said thrust ring toward the bearing surface of said plate and substantially parallel to the longitudinal axis of the bore in said plate; and
(b) a guide socket formed in said plate from the annular shoulder of said counterbore and slidably receiving said guide pin.

16. The fixture of claim 13, further including detent means carried by said insert and engaging said thrust ring for preventing axial movement of said insert relative said thrust ring.

17. The fixture of claim 16, wherein said detent means includes:
(a) an annular groove in the bore of said thrust ring;
(b) an aperture in said insert and having an end thereof communicating with the annular groove in said thrust ring;
(c) a detent element movably carried in said aperture; and
(d) means for projecting said detent element from said aperture into said annular groove.

* * * * *